UNITED STATES PATENT OFFICE.

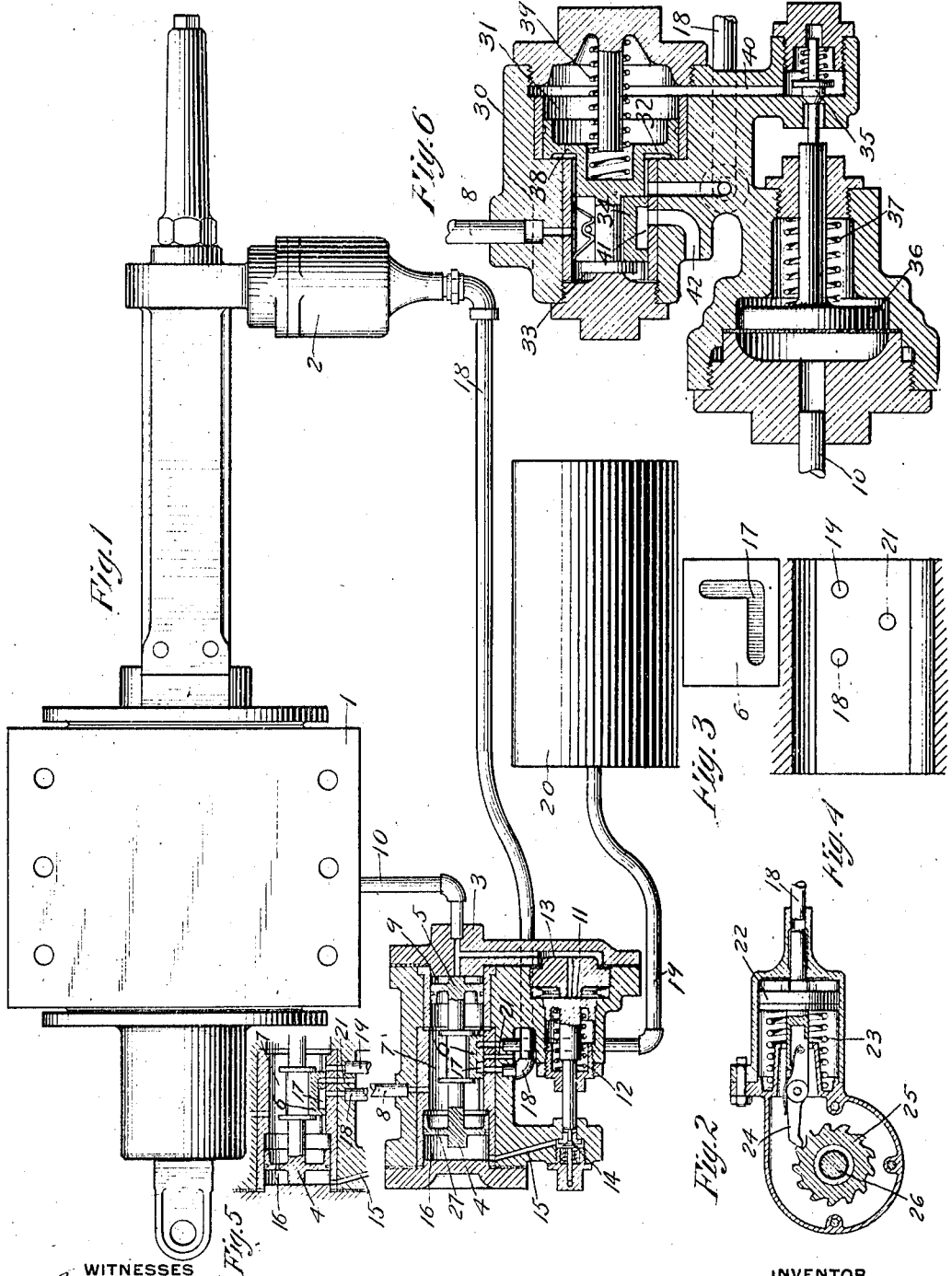

CHRISTOPHER P. CASS, OF MAPLEWOOD, MISSOURI, ASSIGNOR TO THE WESTINGHOUSE AIR BRAKE COMPANY, OF PITTSBURGH, PENNSYLVANIA, A CORPORATION OF PENNSYLVANIA.

PNEUMATIC SLACK-ADJUSTER.

1,055,444. Specification of Letters Patent. Patented Mar. 11, 1913.

Application filed July 25, 1911. Serial No. 640,490.

*To all whom it may concern:*

Be it known that I, CHRISTOPHER P. CASS, a citizen of the United States, residing at Maplewood, in the county of St. Louis and State of Missouri, have invented new and useful Improvements in Pneumatic Slack-Adjusters, of which the following is a specification.

This invention relates to fluid pressure brakes, and more particularly to a slack adjuster for automatically taking up slack due to wear of the brake shoes and the like, so that brake cylinder piston travel may be maintained substantially constant.

The principal object of my invention is to provide an improved slack adjuster of the above character which is adapted to operate positively to take up the slack when the brake cylinder piston travel exceeds a predetermined amount regardless of whether the brake cylinder pressure is light or heavy.

In the accompanying drawing; Figure 1 is an elevation of a brake cylinder and slack adjuster apparatus embodying my invention, the controlling valve mechanism being shown in section; Fig. 2 a sectional view of the slack adjuster; Fig. 3 a face view of the slide valve of the controlling valve mechanism; Fig. 4 a plan view of the seat for said valve; Fig. 5 a sectional view of a portion of the controlling valve mechanism in the position assumed when the brakes are applied and the travel of the brake cylinder piston exceeds the predetermined limit; and Fig. 6 a sectional view of a modified construction of the controlling valve mechanism.

As shown in Fig. 1, a brake cylinder 1 is provided having an air operated slack adjuster 2 and according to my invention, a valve mechanism 3 controls the fluid pressure for operating said slack adjuster.

The valve mechanism 3 comprises connected pistons 4 and 5, the piston 4 being preferably of larger area than piston 5, and said pistons control a slide valve 6. The chamber 7 intermediate the pistons 4 and 5 is connected by a pipe 8 with a suitable source of fluid under pressure, such as the supplemental reservoir of a fluid pressure brake equipment.

The chamber 9 at the outer face of piston 5 is connected by a pipe 10 to a port in the brake cylinder 1, said port being located so that when the brake cylinder piston travel exceeds a predetermined limit, said port is uncovered by the movement of the piston and fluid from the brake cylinder is supplied to said pipe.

A diaphragm 11 in the casing of the valve mechanism is subject on one side to the pressure of an adjustable spring 12 and the opposite side of the diaphragm communicates through passage 13 with the pipe 10. The movement of diaphragm 11 is adapted to actuate a valve 14 for releasing fluid through a passage 15 from chamber 16 at the outer face of piston 4.

The slide valve 6 has a cavity 17 adapted in one position of the valve to connect pipe 18 leading to the slack adjuster 2 with pipe 19 leading to a reservoir 20, and in another position said cavity is adapted to connect pipe 18 with an exhaust port 21.

The slack adjuster is preferably constructed so as to take up slack when fluid under pressure is supplied thereto and as shown in Fig. 2 may comprise a piston 22 subject on one side to the pressure of air in the pipe 18 and on the opposite side to the pressure of a spring 23. The piston 22 is adapted to operate a pawl 24 which coöperates with a ratchet wheel 25 to effect the rotation of a screw 26 and thereby take up the slack.

In operation, the pressure in pipe 10 is normally atmospheric pressure, so that there is atmospheric pressure in chamber 9 on the piston 5, and as the outer face of the diaphragm 11 is subject to atmospheric pressure, the spring 12 operates the diaphragm to permit the valve 14 to close. The piston 4 is provided with a small equalizing port 27 so that fluid under pressure, supplied from the source of pressure through pipe 8 to chamber 7, equalizes into the closed chamber 16. The outer face of piston 5 being subject to atmospheric pressure, the fluid pressure acting on the outer face of piston 4 operates to shift the pistons and valve 6 to the position shown in Fig. 1, in which cavity 17 in the valve 6 connects pipe 18 with pipe 19. So long as the travel of the brake cylinder piston does not exceed the limit of travel determined upon, the slack adjuster and the controlling valve mechanism remain inactive, but if the brake cylinder piston moves out beyond the port opening of pipe 10 in making an application of the brakes, then fluid under pressure is admitted to said pipe and acting on the diaphragm 11 operates the same to open the valve 14. Fluid is thereupon vented through passage 15 from the chamber 16 so that the unbalanced brake cylinder pressure in chamber 9 operates the pistons 4 and 5 to shift the valve 6 to the position shown in Fig. 5, in which cavity 17 in the valve 6 connects pipe 18 with exhaust port 21. The outer face of piston 22 is thus connected to the atmosphere, and the spring 23 of the slack adjuster retracts the pawl 24 to the position shown in Fig. 2. In this position of the controlling valve mechanism, the pipe 19 is uncovered by the valve 6, so that fluid under pressure from the valve chamber 7 is admitted to the reservoir 20. Upon releasing the brakes, pipe 10 is connected to the atmosphere by the release movement of the brake cylinder piston, so that diaphragm 11 is moved by the spring 12 to permit the valve 14 to close. Fluid equalizing into chamber 16 through port 27 thereupon builds up the pressure in said chamber and shifts the pistons to the position shown in Fig. 1, in which the pipe 19 is connected to pipe 18 by cavity 17. Fluid under pressure is then supplied to piston 22 from the reservoir 20 and said piston thereupon actuates the pawl 24 which in turn operates the ratchet wheel 25 to rotate the screw 26 and take up the slack.

If it is not desired to employ the additional reservoir 20, the controlling valve may be constructed as shown in Fig. 6. According to this construction, a casing 30 is provided having a piston chamber 31 containing a piston 32 and a valve chamber 33 containing a slide valve 34 adapted to be operated by the piston 32. The valve chamber 33 is connected to the supply pipe 8 and the pressure in the chamber at the outer face of piston 32 is controlled by a valve 35. The valve 35 is operated by a diaphragm 36 subject on one side to the pressure of a spring 37 and on the opposite side to the brake cylinder pressure supplied thereto through pipe 10. Normally fluid equalizing from valve chamber 33 through port 38 into piston chamber 31 maintains the fluid pressures on opposite sides of the piston 32 in balance, so that spring 39 operates to hold the piston 32 in the position shown in Fig. 6, in which pipe and passage 18 is open to valve chamber 33. It will thus be seen that normally fluid pressure is maintained on the slack adjuster piston 22. When the brake cylinder piston moves out beyond the slack adjuster port, fluid is admitted to pipe 10 and the diaphragm 36, so that the diaphragm 36 is caused to open the valve 35 and vent fluid through passage 40 from the piston chamber 31. The pressure in valve chamber 33 thereupon shifts the piston 32 and valve 34 connects pipe 18 through cavity 41 with exhaust port 42. Fluid is then released from the slack adjuster piston 22, shifting the same to the position shown in Fig. 2. Upon releasing the brakes, the fluid pressure on diaphragm 36 is released and the valve 35 closes. The fluid pressures equalizing on opposite sides of the piston 32, the spring 39 shifts the piston 32 and valve 34 to the position shown in Fig. 6, so that fluid under pressure is admitted to the slack adjuster piston, thus operating the same to take up the slack.

It will now be apparent that with my improved slack adjuster, the slack may be taken up at any brake cylinder pressure sufficient to move the brake cylinder piston beyond the slack adjuster port, as the brake cylinder pressure is not required to do the direct work of taking up the slack, this pressure being merely the agent for effecting the operation of a valve mechanism for supplying fluid from another source to the slack adjuster. Furthermore, the slack is taken up on the release of the brakes, when there is little or no resistance to the operation of the slack adjuster.

Having now described my invention, what I claim as new and desire to secure by Letters Patent, is:—

1. The combination with a pneumatically operated slack adjuster, of a valve mechanism adapted upon applying the brakes to connect the slack adjuster with the atmosphere and upon releasing the brakes to admit fluid under pressure thereto.

2. The combination with a pneumatically operated slack adjuster, of a valve mechanism adapted upon movement of the brake cylinder piston beyond a predetermined point in applying the brakes to connect said slack adjuster with an exhaust port and upon releasing the brakes to admit fluid under pressure thereto to thereby actuate same and take up the slack.

3. The combination with a slack adjuster adapted to take up the slack upon the admission of fluid under pressure thereto, of a valve mechanism for supplying fluid to said slack adjuster upon releasing the brakes.

4. The combination with a slack adjuster adapted to take up the slack upon the admission of fluid under pressure thereto, of a valve mechanism for supplying fluid to said slack adjuster upon releasing the brakes after an application of the brakes where the travel of the brake cylinder piston exceeds a predetermined amount.

5. The combination with a pneumatically controlled slack adjuster, of a valve device for controlling the supply of fluid to said slack adjuster and a valve mechanism subject to the opposing pressures of a spring and the brake cylinder for effecting the operation of said valve device.

6. The combination with a pneumatically controlled slack adjuster, of a valve device for controlling the supply of fluid to said slack adjuster, a movable abutment subject to brake cylinder pressure upon movement of the brake cylinder piston beyond a predetermined point in applying the brakes, and a valve operated by said abutment for varying the pressure on said valve device to effect the operation thereof.

7. The combination with a pneumatically operated slack adjuster, of a valve for supplying and releasing fluid to and from said slack adjuster, a piston for operating same, a movable abutment subject on one side to the pressure of a spring and on the opposite side to brake cylinder pressure upon movement of the brake cylinder piston beyond a predetermined point in applying the brakes, and a valve operated by said movable abutment for venting air from said piston to thereby actuate the supply valve for the slack adjuster.

8. The combination with a pneumatically operated slack adjuster, of a valve mechanism for supplying fluid to said slack adjuster and a reservoir adapted to be charged with fluid under pressure in one position of said valve mechanism and adapted to be connected to said slack adjuster in another position of said valve mechanism.

9. The combination with a pneumatically operated slack adjuster, of a reservoir and a valve mechanism operated by brake cylinder pressure upon movement of the brake cylinder piston beyond a predetermined point in applying the brakes for charging said reservoir with fluid under pressure and adapted upon releasing the brakes to connect the slack adjuster with said reservoir.

10. The combination with a pneumatically operated slack adjuster, of a reservoir, a valve adapted in one position to charge said reservoir fluid under pressure and in another position to connect said reservoir with the slack adjuster, a differential piston provided with two piston heads for operating said valve, a movable abutment subject to brake cylinder pressure in applying the brakes upon movement of the brake cylinder piston beyond a predetermined point, and a valve operated by said abutment for venting air from one of said piston heads to thereby actuate said slack adjuster supply valve.

In testimony whereof I have hereunto set my hand.

CHRISTOPHER P. CASS.

Witnesses:
A. M. CLEMENTS,
W. W. MARTIN.